US010695887B2

(12) United States Patent
Berzon et al.

(10) Patent No.: US 10,695,887 B2
(45) Date of Patent: Jun. 30, 2020

(54) SYSTEMS FOR AND METHODS OF SURFACING A COMPOSITE LENS BLANK WITH FUNCTIONAL LAYER

(71) Applicant: ESSILOR INTERNATIONAL, Charenton-le-Pont (FR)

(72) Inventors: Ronald A. Berzon, Dallas, TX (US); Aref Jallouli, Dallas, TX (US); Hao-Wen Chiu, Dallas, TX (US); Gary S. Clark, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 292 days.

(21) Appl. No.: 15/768,756

(22) PCT Filed: Oct. 21, 2015

(86) PCT No.: PCT/EP2015/074412
§ 371 (c)(1),
(2) Date: Apr. 16, 2018

(87) PCT Pub. No.: WO2017/067597
PCT Pub. Date: Apr. 27, 2017

(65) Prior Publication Data
US 2018/0304431 A1 Oct. 25, 2018

(51) Int. Cl.
*G02C 7/02* (2006.01)
*B24B 13/005* (2006.01)
*B24B 47/22* (2006.01)

(52) U.S. Cl.
CPC .......... *B24B 13/0055* (2013.01); *B24B 47/22* (2013.01); *G02C 7/024* (2013.01)

(58) Field of Classification Search
CPC ...... G02C 7/12; G02C 2202/16; G02C 7/104; G02C 7/02; G02C 7/10; G02C 7/108;
(Continued)

(56) References Cited

U.S. PATENT DOCUMENTS 6,110,016 A * 8/2000 Coleman ............... B24B 13/005
451/390
2008/0026679 A1* 1/2008 Siders ................. B24B 13/0057
451/42
(Continued)

FOREIGN PATENT DOCUMENTS

DE 102 36 713 A1 2/2004
EP 2 263 831 A1 12/2010
WO 2013/072507 A1 5/2013

OTHER PUBLICATIONS

International Search Report, dated May 3, 2016, from corresponding PCT/EP2015/074412 application.

*Primary Examiner* — Yaritza Guadalupe-McCall
(74) *Attorney, Agent, or Firm* — Young & Thompson (57) ABSTRACT

Disclosed are systems and processes for generating a finished or semi-finished lens, such as a spectacle lens, from a lens blank that includes an intermediate functional layer. Some embodiments of the process involve locating the functional layer and positioning the lens blank according to the location of the functional layer. The location of the functional layer can be ascertained by measuring the thickness of one or more layers of the lens blank. The lens blank can be surfaced on one or both sides to form a finished or semi-finished lens. Other embodiments are also described.

20 Claims, 7 Drawing Sheets

(58) Field of Classification Search
CPC .. G02C 13/001; G02C 2202/10; G02C 7/022; G02C 7/024; G02C 7/086
USPC .......................................................... 33/507
See application file for complete search history.

(56) References Cited

U.S. PATENT DOCUMENTS

| | | | |
|---|---|---|---|
| 2009/0109397 A1* | 4/2009 | Arrigotti | B24B 1/00 351/159.81 |
| 2018/0304431 A1* | 10/2018 | Berzon | G02C 7/024 |
| 2019/0072786 A1* | 3/2019 | Krause | G02B 5/283 |
| 2019/0391411 A1* | 12/2019 | Kelch | G02C 7/027 |
| 2020/0041815 A1* | 2/2020 | Gromotka | G01M 11/0278 |
| 2020/0050022 A1* | 2/2020 | Spratt | G02C 7/063 |

* cited by examiner

SYSTEMS FOR AND METHODS OF SURFACING A COMPOSITE LENS BLANK WITH FUNCTIONAL LAYER

BACKGROUND

1. Field of Invention

The present invention relates generally to systems and methods for surfacing a lens blank comprising a functional layer.

2. Description of Related Art

The standard business practice in the progressive power spectacle lenses market is to design and manufacture progressive power semi-finished spectacle lens blanks. One surface (typically the front surface) of a progressive power semi-finished spectacle lens blank is a finished progressive surface, and the other surface (typically the back surface) is unfinished and may be spherical. The progressive surface is designed to have a particular base curve and add power. The base curve is the spherical curve of the distance-vision region of the progressive surface. The add power is the difference in optical power between the near-vision region of the progressive surface and the distance-vision region.

A progressive power semi-finished spectacle lens blank having a particular base curve and a particular add power is suitable for a range of distance-vision optical powers, the range being dependent, for example, on the material and refractive index of the semi-finished lens blank. In general, a manufacturer will typically create a finite set of progressive power semi-finished lens blanks of a design family for a particular material and index. Each progressive power semi-finished lens blank in the set corresponds to a different combination of base curve and add power. The range of distance-vision optical powers for which a semi-finished lens blank of a particular base curve and add power is suitable is determined by the material, index and design.

Optical labs typically keep a stock of progressive power semi-finished lens blanks of a particular design family. When preparing a progressive power spectacle lens for an individual, the lab selects the appropriate semi-finished spectacle lens blank and surfaces and polishes the unfinished surface of the lens blank to fit the individual's prescription. This requires the labs to have a variety of inventory in terms of lens blank types, and not having the specific type can lead to delays in filling a patient's prescription.

The ability to fill a prescription for most or all progressive lenses from a single lens blank for each refractive index would reduce and simplify the labs' inventory and also provide better turnaround times for patients.

SUMMARY

Systems and methods are described herein that can facilitate utilization of a universal lens blank or a reduced inventory of lens blanks. In one aspect of the disclosure, a functionalized lens blank is described. The lens blank comprises a first light-transmitting layer defining a front surface, a second light-transmitting layer defining a back surface, and one or more light-filtering layers located between the first and second light-transmitting layers, where each light transmitting layer of the semi-finished or finished lens has a thickness. The thickness is measured along a direction extending between the front and back surfaces.

In another aspect of the disclosure, methods of making a semi-finished or finished optical lens are described. A method of making a semi-finished or finished optical lens can comprise determining the position of at least a portion of a front surface or a back surface of a lens blank and/or the position of at least a portion of at least one of one or more light filtering layers within a lens surfacing system, wherein the one or more light filtering layers are located between the front surface and the back surface and shaping at least a portion of the front surface or the back surface of the lens blank according to shaping instructions, where the instructions comprise shaping map data indicative of a front surface or back surface of the optical lens such that the front surface or the back surface of the optical lens will not intersect with the one or more light filtering layers. In some embodiments, the lens blank comprises a first light transmitting layer that defines the front surface and a second light transmitting layer that defines the back surface, and the one or more light filtering layers are located between the first light transmitting layer and the second light transmitting layer. In some embodiments, the position of the one or more light filtering layers is determined by referring to the thickness of one or more layers of the lens blank. In some embodiments, the method comprises shaping at least a portion of the first and/or second light transmitting layer according to shaping instructions with reference to the position of the at least one light-filtering layer. In some embodiments, the method further comprises positioning the lens blank so that at least a portion of the one or more light filtering layers is disposed at a zeroed position (or a reference position) on a coordinate axis, where the coordinate axis is an axis that extends between the front surface and the back surface of the lens blank. In some embodiments, the thickness of one or more layers of a first lens blank is measured and such thickness measurements are assumed to be the same for subsequent lens blanks of a batch of lens blanks such that the subsequent lens blanks are positioned according to the thickness measurements of the first lens blank.

Another method of making an optical lens can comprise providing a functionalized lens blank in a lens surfacing system. The functionalized lens blank can be disposed in the lens system such that the peripheral surface extends in a direction substantially parallel to a coordinate axis (e.g., an x-axis, z-axis, or a y-axis). The method further comprises generating instructions to transmit to a lens surfacing tool for shaping the first light transmitting layer of a lens blank where the instructions comprise shaping map data indicative of a front surface or back surface of an optical lens to be made such that this surface would not intersect with the light filtering layer; determining the position of the light filtering layer relative to the coordinate axis; positioning the functionalized blank so that the light filtering layer is disposed at a zeroed position on the coordinate axis; and surfacing the first light transmitting layer to form a semi-finished or finished optical lens; wherein the optical lens has a first portion with a first diopter. In some embodiments, the step of determining the position of the light filtering layer comprises measuring a thickness of one or more layers of the lens blank with a measurement gauge and determining the position of the light transmitting layer on the coordinate based upon the measured thickness. In some embodiments, the step of generating instructions to transmit to a lens surfacing tool comprises receiving geometric characteristics data of a lens blank and of the semi-finished or finished lens and shifting the geometric characteristics data of one or both of the lens blank or the semi-finished or finished lens so that the light filtering layer intersects with the peripheral surface of the semi-finished or finished lens along the entire perimeter of the semi-finished or finished lens.

Another aspect of the disclosure can comprise an optical lens made according to the methods described herein.

In yet another aspect of the present disclosure, a system controller to facilitate lens shaping is described. The system controller can comprise microprocessor and memory and be configured to execute the process of generating instructions to transmit to the lens surfacing tool for shaping the first light transmitting layer where the instructions comprise shaping map data indicative of a front surface or back surface of an optical lens to be made such that this surface would not intersect with the light filtering layer; determining the position of the light filtering layer relative to the z-axis and generating instructions to the lens positioning device for positioning the blank so that the light filtering layer is disposed at a zeroed position on the z-axis. In some embodiments, the system controller is further configured to transmit instructions to the optical measurement gauge for obtaining the thickness of one or more of the first light transmitting layer, the light filtering layer, and the second light transmitting layer and receiving thickness data from the optical thickness measurement gauge to determine the position of the light filtering layer disposed in the lens blank mount. In some embodiments, the system controller is further configured to generate surfacing map instructions to transmit to the lens surfacing tool.

In yet another aspect of the present disclosure, a lens surfacing system to facilitate lens shaping is described. The system for surfacing a lens blank can comprise a lens surfacing tool; a lens positioning device; a lens mount mechanically coupled to the lens positioning device; an optical thickness measurement gauge; and a system controller comprising a microprocessor and memory, wherein the system controller is operatively coupled to the surfacing tool, the lens positioning device, and the optical measurement gauge. In some embodiments, the system controller can be configured to execute the process comprising transmitting instructions to the lens surfacing tool for shaping the first light transmitting layer, where the instructions comprise shaping map data indicative of a front surface or back surface of an optical lens to be made such that the shaped surface does not intersect with the light transmitting layer. In the same or different embodiment, the process can comprise transmitting instructions to the lens positioning device for positioning the blank, where the instructions are based at least in part on the thickness of the one or more layers. In some embodiments, the system controller can be configured to execute the process comprising: generating instructions to transmit to the lens surfacing tool for shaping the first light transmitting layer where the instructions comprise shaping map data indicative of a front surface or back surface of an optical lens to be made such that this surface would not intersect with the light filtering layer; determining the position of the light filtering layer relative to a coordinate axis and generating instructions to the lens positioning device for positioning the blank so that the light filtering layer is disposed at a zeroed position on the coordinate axis. In some embodiments, the system controller is further configured to receive data from the optical thickness measurement gauge to determine the position of the light filtering layer.

The terms "a" and "an" are defined as one or more unless this disclosure explicitly requires otherwise.

Further, a device or system (or a component of either) that is configured in a certain way is configured in at least that way, but can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus or system that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIGS. 2C(i)-(vi) are cross-sectional side views of both lens blank embodiments and finished lens embodiments formed from the illustrated lens blank. The lens blank shown in (i) formed the finished lens shown in (ii); the lens blank shown in (iii) formed the finished lens shown in (iv); and the lens blank shown in (v) formed the finished lens shown in (vi).

DETAILED DESCRIPTION OF ILLUSTRATIVE EMBODIMENTS

As will be described below, embodiments of the present lens surfacing systems include optical measurement and lens surfacing capabilities that are used to surface a functionalized lens blank without intercepting the functional layer.

Figure 1:
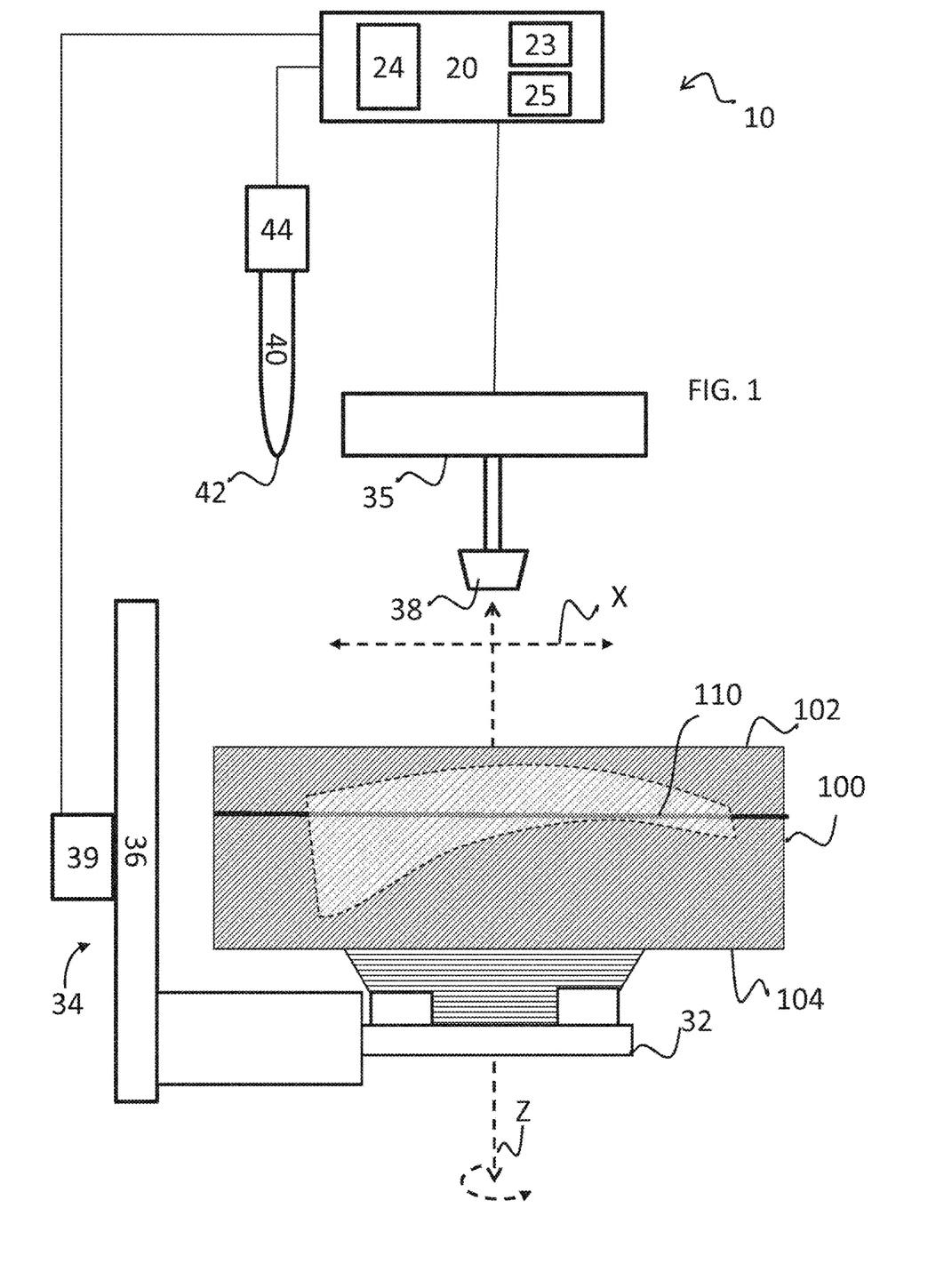
FIG. 1 is a diagram of an embodiment of a lens surfacing system in accordance with the present disclosure. A y-axis is perpendicular to both the x and z axes (e.g., normal to the page).

Referring now to the drawings, and more particularly to FIG. 1, shown therein and designated by the reference numeral 10 is a first embodiment of the present lens surfacing system 10. System 10 presents an illustrative implementation of the present lens surfacing system and is provided and discussed, in large part, for clarity. Of course, other embodiments of the present lens surfacing system may include substantially more complexity (e.g., further lens processing functions, functional pathways, lens processing tools, lens positioning tools, other components, and/or the like).

In the shown schematic of a digitally-controlled lens surfacing system 10, the expression "digitally controlled" designates all of the hardware and software acting to provide movement instructions to all the components of the surfacing system 10.

System 10 is configured to surface a functionalized lens blank 100, such as by milling, lapping, cutting, grinding, and/or polishing a front surface 102 and/or a back surface 104 of the lens blank 100 to form a semi-finished or finished lens. One or more filtering layers 110 (described below) may be positioned between the front surface 102 and the back surface 104 of the lens blank 100.

System 10 comprises one or more surfacing tools 35, a lens blank mount 32, a mount positioning device 34, and an online measurement gauge 40. The online thickness measurement gauge 40 for measuring a thickness of a lens blank is schematically depicted. The online thickness measurement gauge 40 generally comprises an optical measurement head 42 coupled to an optical head positioning device 44. The optical measurement head 42 is disposed relative to the lens blanks 100 so that the measurement transmission passes through one of either the front or back surface of the lens blank 100. The system controller 20 is operatively coupled to the optical measurement head 42 and the positioning device 44.

In some embodiments, the surfacing tool 35 comprises a shaping head 38 that is configured to move along one or more coordinate axes, e.g., an x-axis, a y-axis, and/or a z-axis. Surfacing tools actuatable with the present control system 20 may include any suitable tool, such as, for example, a single crystal diamond tool used on turning machine but also a milling or grinding tool.

The lens blank 100 is positioned on the lens blank mount 32. The positioning device 34 may be used to position the lens blank mount 32 with respect to the surfacing tool 35. Lens positioning device 34 may be configured to move the lens blank mount 32 along an x-axis, a y-axis, or a z-axis.

By way of example, the lens mount positioning device 34 may comprise a rail 36. The lens blank mount 32 is positionable along the length of the rail 36. The rail 36 can be positioned substantially perpendicular relative to the lens blank mount 32. The rail 36 can include a worm gear (not shown) that extends along a length of the rail 36. The worm gear is driven by a motor 39. The lens blank mount 32 is mechanically coupled to the worm gear such that, as the worm gear is rotated by motor 39, the lens blank mount 32 and the lens blank 100 traverse along the rail 36 in the +/−z direction. The direction of traverse (+/−z) is dependent on the rotational direction of the motor 39.

System 10 further comprises a system controller 20 provided with a data-processing system comprising a microprocessor 23 equipped with a memory 24, especially a non-volatile memory, allowing it to load and store a software program, that, when it is executed in the microprocessor 23, allows a surfacing process to be implemented. This non-volatile memory 24 can be, for example, a ROM (read-only memory). Furthermore, the controller 20 comprises a memory 25, especially a volatile memory, allowing data to be stored during the execution of the software package and the implementation of the process. This volatile memory 25 may be, for example, a RAM or EEPROM ("random access memory" or "electrically erasable programmable read-only memory", respectively).

Figure 2A:
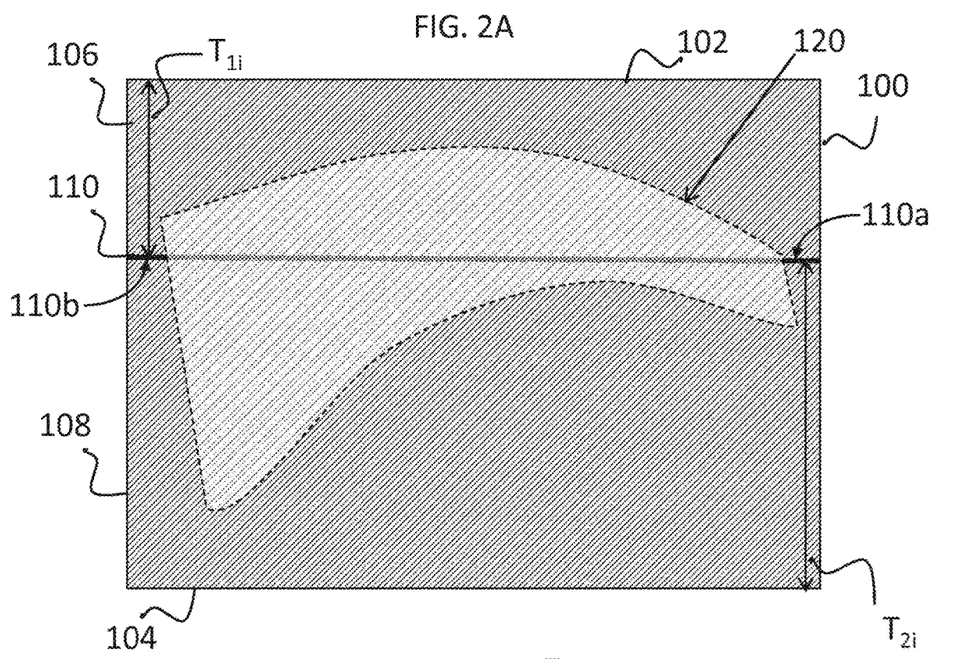
FIG. 2A is cross-sectional side view of a lens blank embodiment with a functional layer, in accordance with the present disclosure.

Referring to FIG. 2A, a functionalized optical lens blank 100 defines a front surface 102 and a back surface 104 opposite the front surface 102 and comprises a first light-transmitting layer 106 defining the front surface 102, a second light-transmitting layer 108 defining the back surface 104, and one or more light-filtering layers 110 located between the first and second light-transmitting layers 106, 108. The light filtering layer 110 comprises one or more layers that have one or more functionalities desired for the lens. The term "light filtering" means that the electromagnetic spectrum entering the filtering layer 110 is different from the electromagnetic spectrum exiting the filtering layer 110 and also different from an electromagnetic spectrum passing only through the light transmitting layers. The term "light transmitting" means that light is transmitted through the layer. One or both of light transmitting layers 106, 108 may also have one or more functionalities.

The functionalized lens blank 100 may be prepared by a number of techniques include lamination, injection molding, bulk casting, extrusion, compression molding, 3D additive manufacturing, layer by layer buildup, solvent casting, or a combination thereof.

Each light transmitting layer 106, 108 has a thickness; that is the distance between the light filtering layer 110 and the respective surface 102, 104. In particular, the first light transmitting layer 106 has an initial thickness $T_{1i}$ and the second light transmitting layer 108 has an initial thickness $T_{2i}$. Each light transmitting layer 106, 108 can have a thickness suitable for surfacing to obtain the desired diopter or plurality of diopters. For example, each light-transmitting layer 106, 108 may have a thickness of between about 0.2 mm to about 20 mm. For example, the thickness of one or both light-transmitting layers 106, 108 can be selected from 0.2 mm, 0.4 mm, 0.6 mm, 0.8 mm, 1 mm, 1.2 mm, 1.4 mm, 1.6 mm, 1.8 mm, and 2 mm. The thickness of each light transmitting layer 106, 108 may be the same or different. In some embodiments, one or both of the light filtering layer interfaces 110a, 110b with the light transmitting layers 106, 108 may substantially parallel with the front surface 102 and/or the back surfaces 104.

Each light transmitting layer 106, 108 may be comprised of any material suitable for lenses, such as eyeglass lenses. The material of one light transmitting layer 106, 108 may be the same or different as the other light transmitting layer 106, 108. In some embodiments, one or both light-transmitting layers 106, 108 are thermoset polymers, e.g., thermoset polycarbonates, polyurethanes; polythiourethanes; polysulfides; polydiallylglycolcarbonates; cross-linked thermoplastics (such as cross-linked acrylates, cross-linked methacrylates, or cross-linked styrenics); or combinations thereof. In the same or different embodiments, thermoplastic polymers may be used, such as, polycarbonates, polyamides, polysulfones, polyacrylates, polymethacrylates, polymethylmethacrylate, polyesters, polystyrenics, polystyrene, thermoplastic polyurethanes, styrene maleic anhydride polymers, polyethylene terephthalate, polythioethers, polycyclocthiophenes, polythianthrene, polyimides, poly tetrathiaanthracene, and their copolymers, cyclo olefin polymers or copolymers, styrene/methyl methacrylate mopolymer, alicyclic polycarbonate copolymer, or combinations thereof. Inorganic materials, such as a metal oxide or a combination of metal oxides, may also be used. Examples of suitable metal oxides include silicon oxide, aluminum oxide, zirconium oxide, titanium oxide, hafnium oxide, indium oxide, gallium oxide, copper oxide, or a combination thereof. In some embodiments, a suitable inorganic material is glass or glass-like materials. In some embodiments, one or both light-transmitting layers can be any combination of thermoset polymers, thermoplastic polymers, and inorganic materials.

Examples of filtering layers may include photochromic layers, tinted layers, polarizing layers, UV light filter layers, blue light filter layers, NIR filter layers, neutral density filter layers, mirror layers, metallized layers, micropatterned layers, electrochromic layers, or antireflective layers. In some embodiments, a light filtering layer is a layer configured to modify, selectively or not, the transmittance by increasing or decreasing at least one wavelength based on physical phenomena of absorption and/or reflection. In some embodiments, filtering layers comprise a film structure which may be a monolayer or multilayers and which comprise the material able to provide the filter function as for example dyes, pigments, absorbers, optical brightener, photochromic dyes, dichroic dyes, metallic particules. The material of said film may be, for example, polyvinyl alcohol, polyethylene terephtalate, polyvinyl, cellulose triacetate, polyurethane, polycarbonate, cyclo-olefine polymer and co-polymer, polyether block amide. Filtering layers may be flat or curved with a convex side and/or a concave side.

In some embodiments, one or both of the light transmitting layers also includes some functionality. For example, one or both of the light transmitting layers can be photochromic layers, tinted layers, light filtering layers, (e.g., UV light filters, blue light filters, and/or NIR filters), or combinations thereof.

The shape of the lens blank 100 may vary. In some embodiments, the front surface 102 and the back surface 104 of the lens blank 100 are substantially parallel. Alternatively, one or more of the front surface 102 and the back surface 104 are substantially curved. In addition, the curvature of front surface 102 can be the same or different from the curvature of back surface 104. In some embodiments, a curvature of the light filtering layer 110 may be different from the curvature of the front surface 102 and/or the back surface 104 of the lens blank. The filtering layer 110 may be substantially curved or substantially straight. Upon surfacing a lens blank 100, e.g., on one or both sides can be surfaced according to a shaping map, as visually depicted in dashed lines at element 120.

Figure 2B:
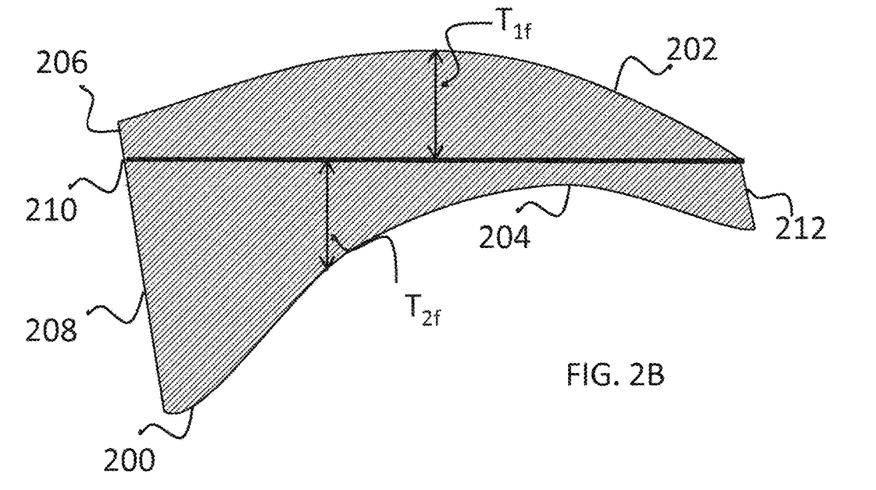
FIG. 2B is cross-sectional side view of a finished lens embodiment with a functional layer formed from a lens blank like that shown in FIG. 2A, in accordance with the present disclosure.
Figure 2C:
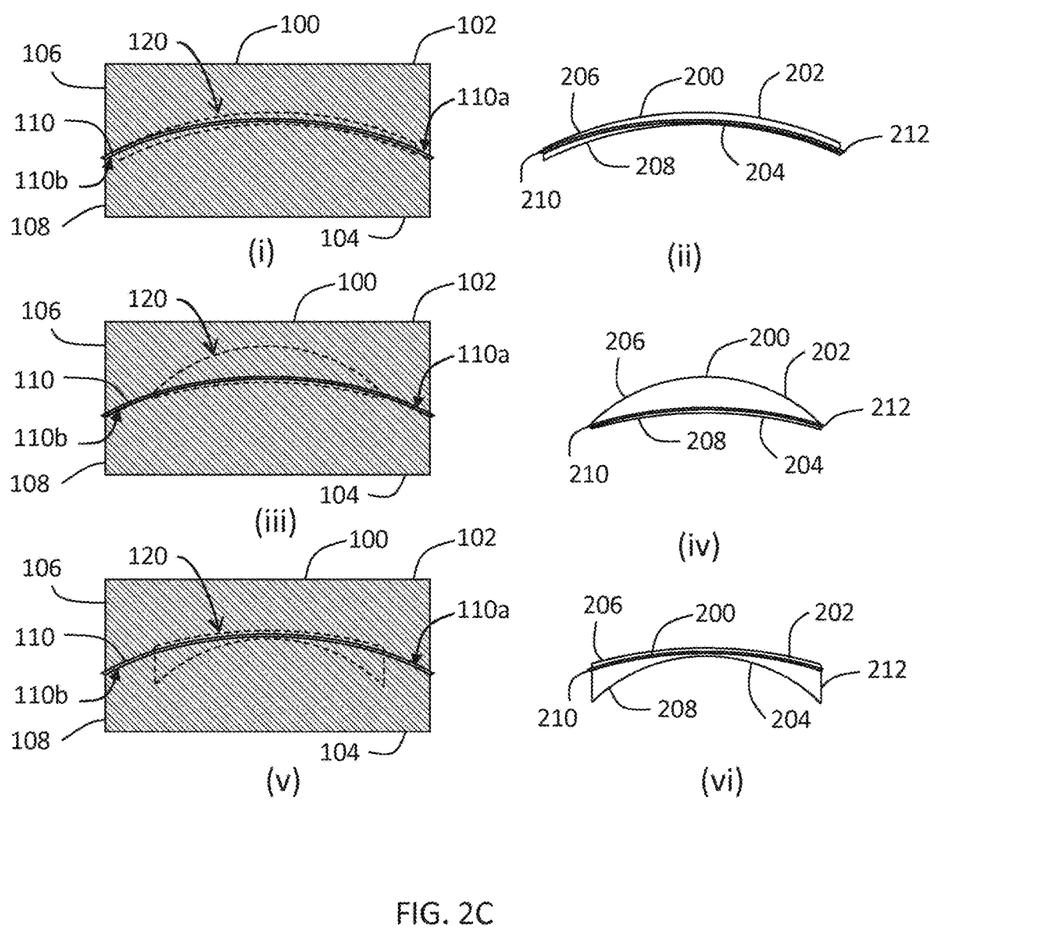

Referring to FIG. 2B, a semi-finished or finished lens 200 is formed. The term "semi-finished lens" implies that additional surfacing is needed, whereas "finished lens" implies that no further surfacing on the front or back surfaces is required. A semi-finished or finished optical lens 200 defines a front surface 202 and a back surface 204 opposite the front surface 202 and a peripheral surface 212 extending between the front surface 202 and the back surface 204 and comprising a front light-transmitting layer 206 defining the front surface 202, a back light-transmitting layer 208 defining the back surface 204, and one or more light-filtering layers 210 located between the front and back light-transmitting layers 206, 208. In accordance with the present disclosure, the light filtering layer 210 is exposed at the peripheral surface of the semi-finished or finished optical lens. The front light transmitting layer 206 has a final thickness $T_{1f}$ and/or the back light transmitting layer 208 has a final thickness $T_{2f}$ after the lens is surfaced. In some embodiments, the final thickness of one or both layers 206, 208 may be greater than a minimum thickness value, such as at least 10 µm, 25 µm, 50 µm, 75 µm, 100 µm, or more.

The finished optical lens 200 can have one or more portions with different diopters. The finished optical lens 200 may have a first portion with a first diopter and a second portion with a second diopter that is different than the first diopter. In some embodiments, the first diopter and the second diopter have a difference of at least 0.125 diopters and less than 10 diopters between the two portions, such as a difference of at least 0.2, 0.5, 0.75, 1, 1.5, 2, 3, 4, 5, 6, 7, 8, or 9 diopters. The curvature of the front surface, back surface, or both surfaces can contribute to the diopter value. In some embodiments, a finished lens 200 can have a power of 20 diopters to 14 diopters. In some embodiments, the back surface at the first portion or the second portion can have a radius of curvature of at least 25 mm, 26 mm, 27 mm, 28 mm, 29 mm, 30 mm, 31 mm, 32 mm, 33 mm, 34 mm, 35 mm, 36 mm, 37 mm, 38 mm, 39 mm, 40 mm, 41 mm, 42 mm, 43 mm, 44 mm, 45 mm, 46 mm, 47 mm, 48 mm, 49 mm, or 50 mm. In some embodiments, the front surface 202 may have a convex region or a concave region. Similarly, in the same or different embodiments, the back surface 204 may have concave region or a convex region. The finished optical lens 200 may be a single vision, progressive, aspheric, or optical prism lens.

In some embodiments, lens blanks 100 can come in an assortment of sizes, and a lens blank 100 of a particular size is selected based upon the finished lens dimensions and/or degree of curvature. The lens blanks 100 can vary by thickness of the first and second transmitting layers 106, 108, by the surface area or the front and back surfaces 102, 104, or both. For example, an assortment of lens blanks 100 can have different options in surface area of the front and back surfaces 102, 104, but the thickness of the first and second light transmitting layers 106, 108 may be consistent for all size options. With such embodiments, the thickness may be suited for all or most semi-finished or finished lens curvatures so that neither the front surface nor the back surface of the semi-finished or finished lens intersects the light filtering layer 210. For example, the thickness of a light transmitting layer 106, 108 may be 0.2 mm, 0.3 mm, 0.4 mm, 0.5 mm, 0.6 mm, 0.7 mm, 0.8 mm, 0.9 mm, 1 mm, 1.2 mm, 1.5 mm 2 mm, 2.5 mm, 3 mm, 3.5 mm or more. The thickness of the first light transmitting layer 106 may be the same or different from the second light transmitting layer 108.

In other embodiments, an assortment of lens blanks 100 may include lens blanks 100 that vary with respect to front and back surface areas and also with respect to light transmitting layer thicknesses. Lens blanks 100 comprising thin layers may be useful for manufacturing lenses that have lower degrees of curvature, relative to lens with higher degrees that would require thicker layers. The variety in sizes can minimize the amount of material removed from the lens blank 100 to produce a semi-finished or finished lens.

Of course, it is also contemplated that a lens blank 100 can be a universal lens blank that is sized to suit all or most semi-finished or finished lens surface areas and degrees of curvature.

Before surfacing the lens blank 100, data indicative of a lens shaping map 120 is obtained to produce a desired semi-finished or finished lens 200. Data indicative of the lens shaping map 120 is part of the instructions provided by the system 10 to shape the surface of the lens blank 100. The lens shaping map data is derived from a semi-finished or finished lens map data and a lens blank map data. These data maps are indicative of the outer surface as well as light transmitting layer interfaces for the lens blank, e.g., a front surface, a back surface, a peripheral surface, and light transmitting layer interfaces. These maps may be defined and stored as a three-dimensional set of points (or vertices).

Referring to FIG. 2C (i)-(vi), an example of a lens blank with a curved filtering layer 110 that forms different finished lenses is illustrated. An example of lens blank 100 and a finished lens overlay is shown in (i) and the corresponding finished lens 200 is shown in (ii); another example of lens blank 100 and a finished lens overlay is shown in (iii) and the corresponding finished lens 200 is shown in (iv); and another example of lens blank 100 and a finished lens overlay is shown in (v) and the corresponding finished lens 200 is shown in (vi). Each optical lens blank 100 of FIG. 2C define a front surface 102 and a back surface 104 opposite the front surface 102 and comprises a first light-transmitting layer 106 defining the front surface 102, a second light-transmitting layer 108 defining the back surface 104, and one or more light-filtering layers 110 located between the first and second light-transmitting layers 106, 108. Each semi-finished or finished optical lens 200 of FIG. 2C define a front surface 202 and a back surface 204 opposite the front surface 202 and a peripheral surface 212 extending between the front surface 202 and the back surface 204 and comprising a front light-transmitting layer 206 defining the front surface 202, a back light-transmitting layer 208 defining the back surface 204, and one or more light-filtering layers 210 located between the front and back light-transmitting layers 206, 208.

Figure 3:
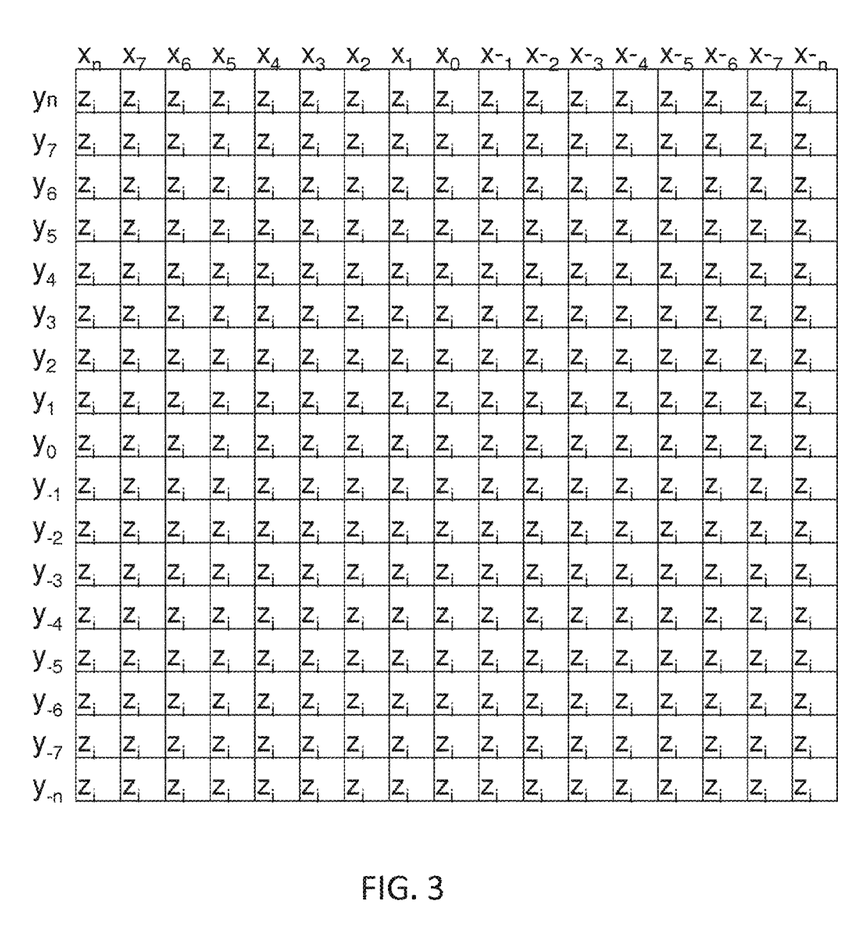
FIG. 3 is a schematic matrix of depth values ($Z_i$) corresponding to points on a lens blank surface that define a shaping map.

Referring to FIG. 3, a simplified version of a lens shaping map 120 is shown. As illustrated, each point (x, y, z) represents a coordinate on a surface to which the lens blank is to be milled, ground, lapped, cut, or polished on one of the lens blank surfaces. In some embodiments, $Z_i$ represents, in effect, the thickness of one of the light transmitting layers of the semi-finished or finished lens.

To select a lens blank 100 with a certain thickness that will be suitable to form the desired lens, the amount of lens blank to be removed must be less than the initial thickness value, and in some embodiments, less than the initial thickness value minus a minimum thickness value, which may be user defined or defined by the magnitude of the system and/or lens blank tolerances. A software program may be configured to receive the semi-finished or finished lens map data and the lens blank data and perform a comparison between the two to develop the lens shaping map 120 and recommend a lens blank of a particular size that would ensure that neither the front surface or the back surface of the shaping map 120 intersects the light filtering layer of the blank.

Figure 4:
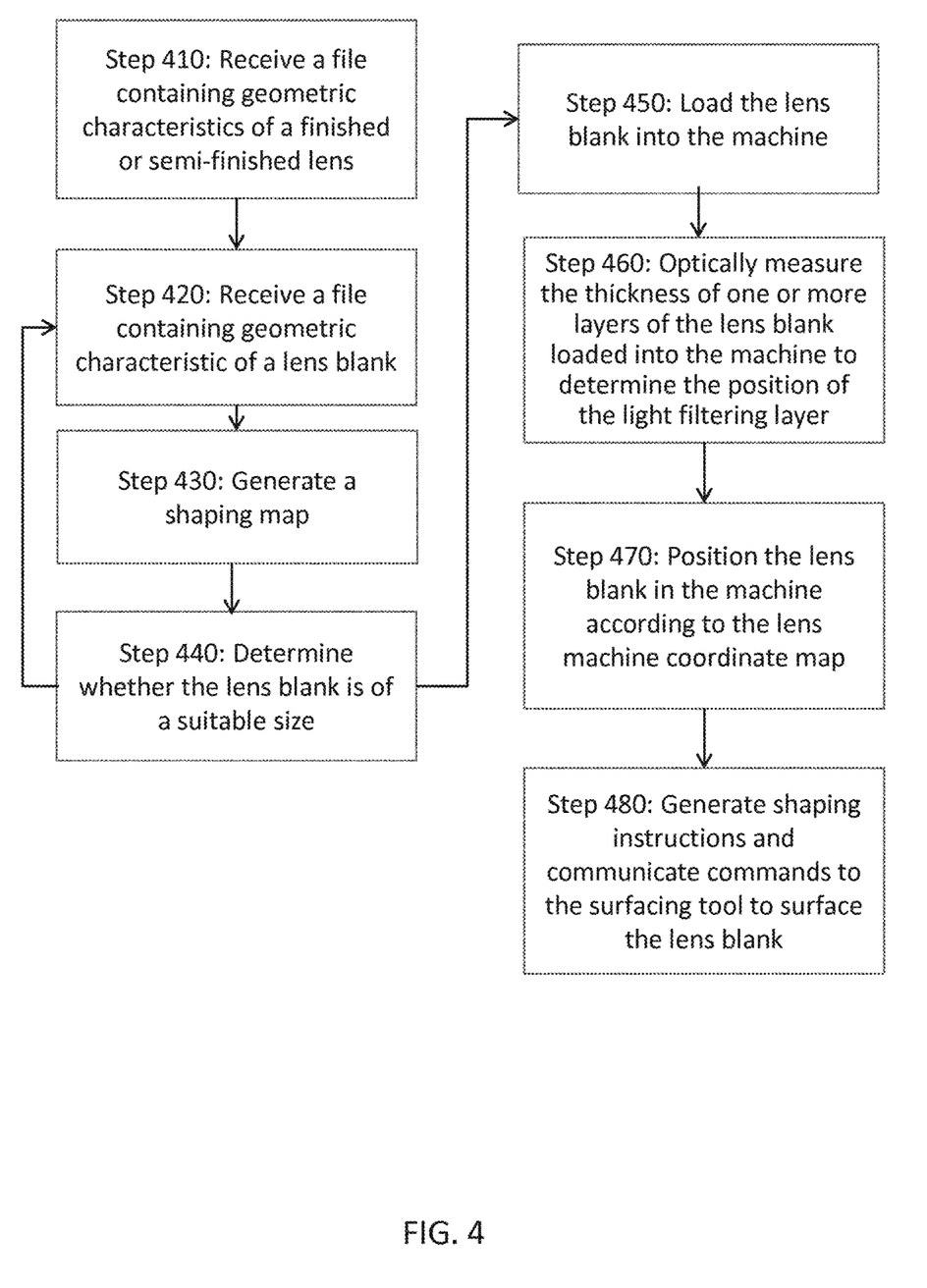
FIG. 4 is a flow chart of an embodiment of a lens surfacing method in accordance with the present disclosure.

FIG. 4 is a flowchart of the steps comprised in a process for surfacing a lens blank 100. In practice, a computer program embodying the steps shown in FIG. 4 is loaded in to memory 24 (FIG. 1) and programs the operation of microprocessor 23 to control the operation of system 10 in accordance with the present disclosure.

Once the appropriate lens blank is designated, the lens blank 100 is loaded and positioned in the lens surfacing system 10 so that the lens may be surfaced according to the lens shaping map 120 (an exemplary portion of which is visually depicted within the lens blank in dashed lines of FIG. 2A). In some embodiments, positioning the lens blank 100 comprises measuring the thickness of the light transmitting layer to be surfaced with the optical measurement gauge 40, and based on the measured thickness, adjusting the position of the lens blank 100 along the z-axis so that at least portion of the interface between the light filtering layer 110 and the respective layer (106 or 108) to be shaped is at a zeroed position, e.g., a z=0 position according to a lens system coordinate map.

The system controller 20 is configured to receive, in step 410, a file containing geometric characteristics of a semi-finished or finished lens. For example, in some embodiments, the file may contain geometric characteristics of a front surface and/or a rear surface of a semi-finished or finished lens, for example, in the form of x, y, z coordinates in a Cartesian coordinate system, representing said surface at a finite number of points on the system. The file can be generated by and exported from any commercially available computer-aided design (CAD) software. In some embodiments, the file can contain the geometric characteristics of substantially the entire outer surfaces of a semi-finished or finished lens, e.g., the front surface, the rear surface, and the peripheral surface, in the form of x, y, z coordinates. In some embodiments, instead of a Cartesian referential, as described above, a cylindrical referential $(r,\theta)$ or a spherical referential $(r,\theta)$ can be used. In some embodiments using a cylindrical or spherical referential, the origin would be within the light filtering layer. It is understood that other coordinate systems may also be used to represent the geometric characteristics of the lens blank, the optical lens, and the lens surfacing system.

The system controller 20 is configured to receive, in step 420, a file containing geometric characteristics of a lens blank 100. For example, in some embodiments, the file contains geometric characteristics of the back surface and the interface of the back transmitting layer with the light filtering layer of the lens blank, for example, in the form of x, y, z coordinates in a Cartesian coordinate system, representing said surfaces at a finite number of points on the system. The file may be generated by and exported from commercially available computer-aided design (CAD) software according to design specifications.

In other embodiments, the file may be generated by taking multiple measurements with an optical measurement gauge 40 configured to take measurements at multiple points on a front or back surface of the lens blank to generate the geometric characteristic data of the lens blank. In some embodiments, the file may contain geometric characteristics of a front surface and the interface of the front transmitting layer with the light filtering layer of the lens blank in the form of x, y, z coordinates.

In still other embodiments, the file may contain the geometric characteristics of substantially the entire outer surface and the layer interfaces, e.g., the back surface and the interface of the back transmitting layer with the light filtering layer 110, the front surface and the interface of the front transmitting layer with the light filtering layer, and the peripheral surface, in the form of x, y, z coordinates. The file containing the geometric characteristics of the lens blank 100 may further contain geometric characteristics of a boundary surface that defines the minimal surrounding thickness of the lens blank that could be managed by the surfacing system.

The system controller 20 may be configured to generate, in Step 430 a shaping map 120 (e.g., FIG. 3) for shaping a front surface and/or a back surface of the lens blank 100 to form a semi-finished or finished lens. To facilitate generating a shaping map 120, in some embodiments, the system controller 20 is configured to virtually locate the semi-finished or finished lens within the lens blank and satisfy the condition that the light filtering layer intersects with the peripheral surface of the semi-finished or finished lens along substantially the entire perimeter of the semi-finished or finished lens. For example, the system controller 20 is configured to translate and/or rotate (collectively, to "shift") the geometric characteristics of the semi-finished or finished lens or the lens blank 100 so that the light filtering layer intersects with the peripheral surface of the semi-finished or finished lens along substantially the entire perimeter of the semi-finished or finished lens. The shift would ensure that each of a plurality of x, y coordinates on the peripheral surface of the semi-finished or finished lens that define a circumscribing ring is equal to an x, y coordinate of the light filtering layer of the lens blank. There may be several orientations of the semi-finished or finished lens within the lens blank that can satisfy these rules, and therefore, multiple set of x, y coordinates may satisfy these rules. A preferred set would be one where the z-value for the set of x, y coordinates defining a portion of the peripheral surface is closest to the average z-value of the peripheral surface.

From a selected set, a shaping map 120 may be generated, such as one similar to FIG. 3. A front surface shaping map 120 is derived from the geometric characteristics defining the front surface of the semi-finished or finished lens after the geometric characteristics have been shifted, and a back surface shaping map 120 is derived from geometric characteristics defining the back surface of the semi-finished or finished lens after the geometric characteristics have been shifted.

In some embodiments, the system controller 20 may be configured to determine, in Step 440, an appropriately sized lens blank by selecting the most suitable lens blank among a selection of lens blanks. If multiple lens blank sizes are available, lens blanks of different sizes (e.g., volume, surface area, or thickness) may be sampled to determine if a shaping map 120 (e.g., FIG. 3) can be generated for that particular size. For example, in some embodiments, the sampling may proceed in order from the smallest volume lens blank to the largest volume lens blank. In some embodiments, if no set of x, y coordinates that defines a circumscribing ring and a portion of the peripheral surface of the semi-finished or finished lens is equal to an x, y coordinate of the light filtering layer of the lens blank, then the lens blank of that volume would not be suitable. The analysis to generate a shaping map 120 can be executed on the next largest lens blank sorted by volume. The lens blank of the smallest volume from which a shaping map 120 can be generated could be the most suitable or at least the one selected for surfacing. Instead of volume, the lens blanks can be sorted by their front/back surface area and/or light transmitting layer thicknesses. The selected lens blank is loaded into the surfacing system 10 (Step 450), and instructions that include the generated shaping map 120 are transmitted to the lens surfacing tool 35.

The lens surfacing system 10 is configured to locate and position the lens blank in physical space so that the shaping map 120 instructions can be executed upon the lens blank.

To facilitate locating and positioning the lens blank, in some embodiments, the system controller 20 is configured to instruct, in Step 460, an online measurement gauge 40 to measure the thicknesses of one or more layers of the lens blank loaded in a lens blank mount 32 and is configured to receive such measurements to facilitate positioning of the lens blank.

One embodiment of an online thickness measurement gauge 40 may comprise an optical measurement head 42 adjustably mounted on the positioning device 44 such that the position of the optical measurement head may be adjusted with respect to the lens blank loaded in the mount 32. System controller 20 may be configured to position the online measurement gauge 40 via the optical head positioning device 44 to facilitate taking the desired measurements. The online measurement gauge 40 is configured to measure the head-lens separation distance and the thickness of the plurality of layers of the lens blank, e.g., the light transmitting layers and the light filtering layer. The term "head-lens separation distance," as used here, refers to the spacing between a surface plane of the lens being measured and the imaging plane of the optical measurement head of the online thickness measurement gauge.

The optical measurement head 42 of the online thickness measurement gauge 40 is used to measure the thickness of a multilayered lens, as well as the separation distance between the lens and the optical measurement head, including, without limitation, low coherence interferometry devices, confocal devices and optical triangulation devices. Optical measurement head 42 may comprise optical measurement instruments suitable for measuring the thickness of a multilayered lens as well as the separation distance between the lens and the optical measurement head. For example, in some embodiments, the optical measurement head 42 is a low coherence interferometer such as the OptiGauge™ instrument manufactured by Lumetrics. However, it should be understood that other types of optical measurement instruments may be utilized as the optical measurement head 42 of the online thickness measurement gauge 40. The positioning device 44 may be configured to position the optical measurement head 42 with respect to the lens blank.

Furthermore, the system controller 20 is configured to position, in Step 470, a lens blank 100 loaded in a lens blank mount 32. The system controller 20 is operatively coupled to the lens positioning device 34 and configured to actuate the lens positioning device 34. In some embodiments, positioning the lens blank can comprise determining the position of the light filtering layer relative to the z-axis (with the use of the thickness measurements in Step 460) and positioning the lens blank so that the light filtering layer is located along a z=0 plane or within a defined z-axis range. The defined z-axis range may be determined, at least in part, by one or more of the surfacing tools range of movement along the z-axis, the maximum z-value ($z_{max}$) of the lens shaping map 120, and a minimum thickness value. The system controller 20 may be configured to determine the position of the light filtering layer based upon the thickness measurements and the head-lens separation distance received from the online measurement gauge described in step 460.

Moreover, the system controller 20 may be operatively coupled to one or more surfacing tools 35 and configured to generate, in Step 480, shaping instructions and communicate commands to one or more surfacing tools 35 per the shaping instructions. The shaping instructions define coordinates (e.g., x, y, z) above which material is to be removed from the respective lens blank surface.

In an alternative system and process for surfacing a lens blank, an optical measurement gauge is not incorporated into the lens surfacing system. For example, the system is the same as that shown in FIG. 1 except the optical measurement gauge 40 is not incorporated into the system but is a separate apparatus with its own lens blank mount and with the same or different system controller 20. This process is similar to that described above except for differences noted below.

Figure 5:
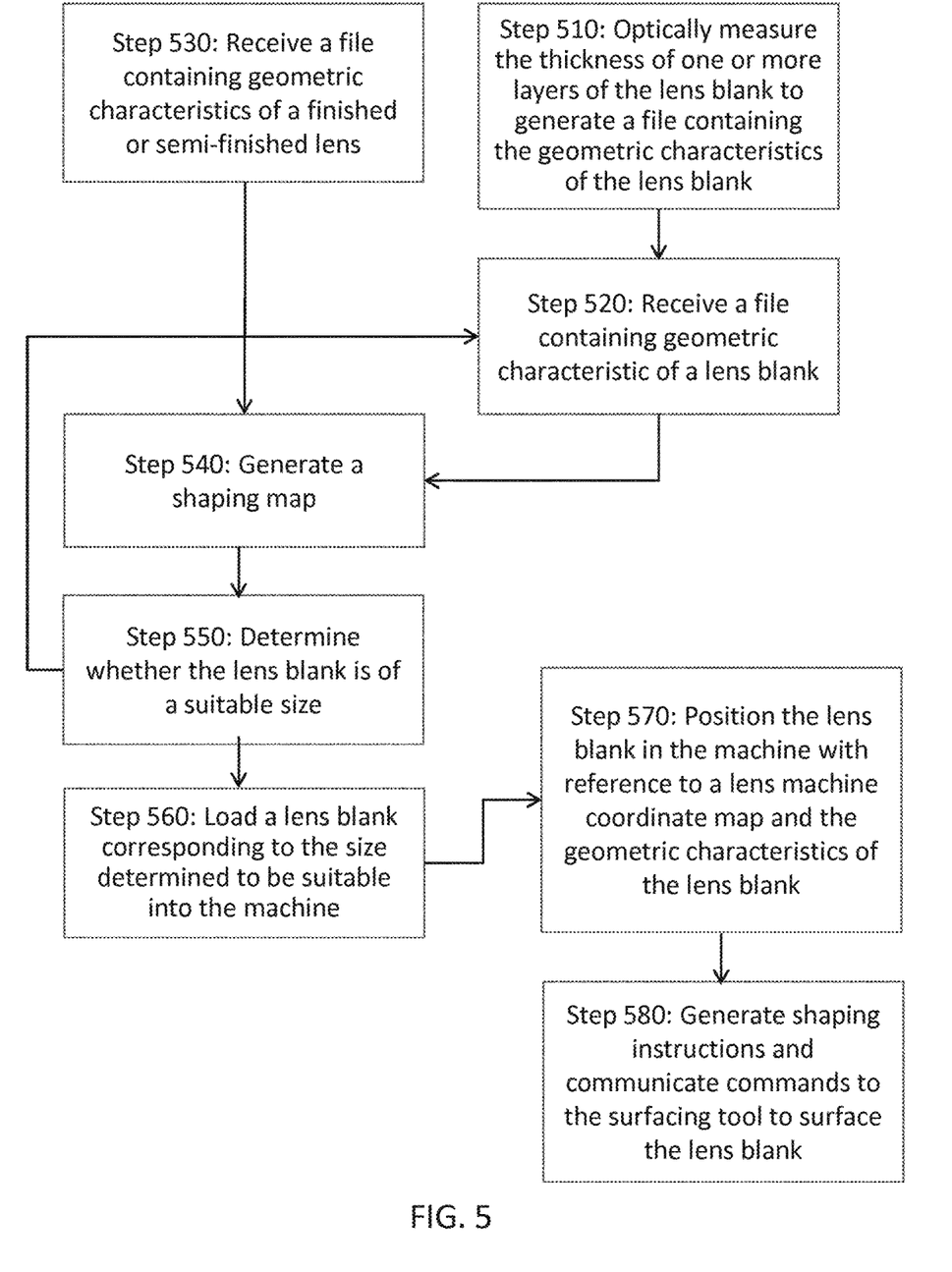
FIG. 5 is a flow chart of another embodiment of a lens surfacing method in accordance with the present disclosure.

Referring to FIG. 5, the optical measurement gauge 40 can be configured to optically measure, in step 510, the thickness of the layers at one or multiple points on a front or back surface of the lens blank. The measurements are used to create geometric characteristic data of the lens blank that is in turn used to generate instructions to position the lens blank loaded into the lens shaping system. Sufficient measurements may also be taken and used to create geometric characteristic data that may also be used to generate the shaping map 120.

The system controller 20 is configured to receive, in step 520, a file containing geometric characteristics of a lens blank 100. The file can be generated from the measurements taken by the optical measurement gauge, or generated by a commercially available computer-aided design (CAD) software. The system controller 20 is configured to receive, in step 530, a file containing geometric characteristics of a semi-finished or finished lens.

The system controller 20 may be configured to generate, in Step 540, a shaping map 120 (e.g., FIG. 3) for shaping a front surface and/or a back surface of the lens blank 100 to form a semi-finished or finished lens. In some embodiments, the system controller 20 may be configured to determine, in Step 550, an appropriately sized lens blank by selecting the most suitable lens blank among a list of lens blanks. The selected lens blank is loaded into the surfacing system 10 (Step 560), and instructions that include the generated shaping map 120 are transmitted to the lens surfacing system 10. Lens surfacing system 10 is configured to locate and position, in step 570, the lens blank in physical space according to the optical measurement data obtain in Step 510 so that the shaping map 120 instructions can be executed upon the lens blank. To facilitate locating and positioning the lens blank, in some embodiments, the system controller 20 is configured to receive geometric characteristic file of the lens blank and a reference file of the lens system coordinate system to generate positioning instructions to position the light filtering layer relative to the z-axis, e.g., positioning the lens blank so that the light filtering layer is located along a z=0 plane or within a defined z-axis range. Moreover, the system controller 20 may be operatively coupled to one or more surfacing tools 35 and configured to generate, in Step 580, shaping instructions and communicate commands to one or more surfacing tools 35 per the shaping instructions.

The embodiments described above involve surfacing only a single surface, either the front surface or the back surface of the lens blank, at a time, in any order. If it is desired to surface both surfaces of a lens blank, then after one surface is completed, the lens mount or the semi-finished lens may be rotated 180° so that the other surface is facing the lens surfacing tool. System controller 20 may be configured to communicate a command to the mount positioning device to rotate the lens mount in this way, and the positioning device can be configured to receive such commands and rotate the lens mount accordingly.

Figure 6:
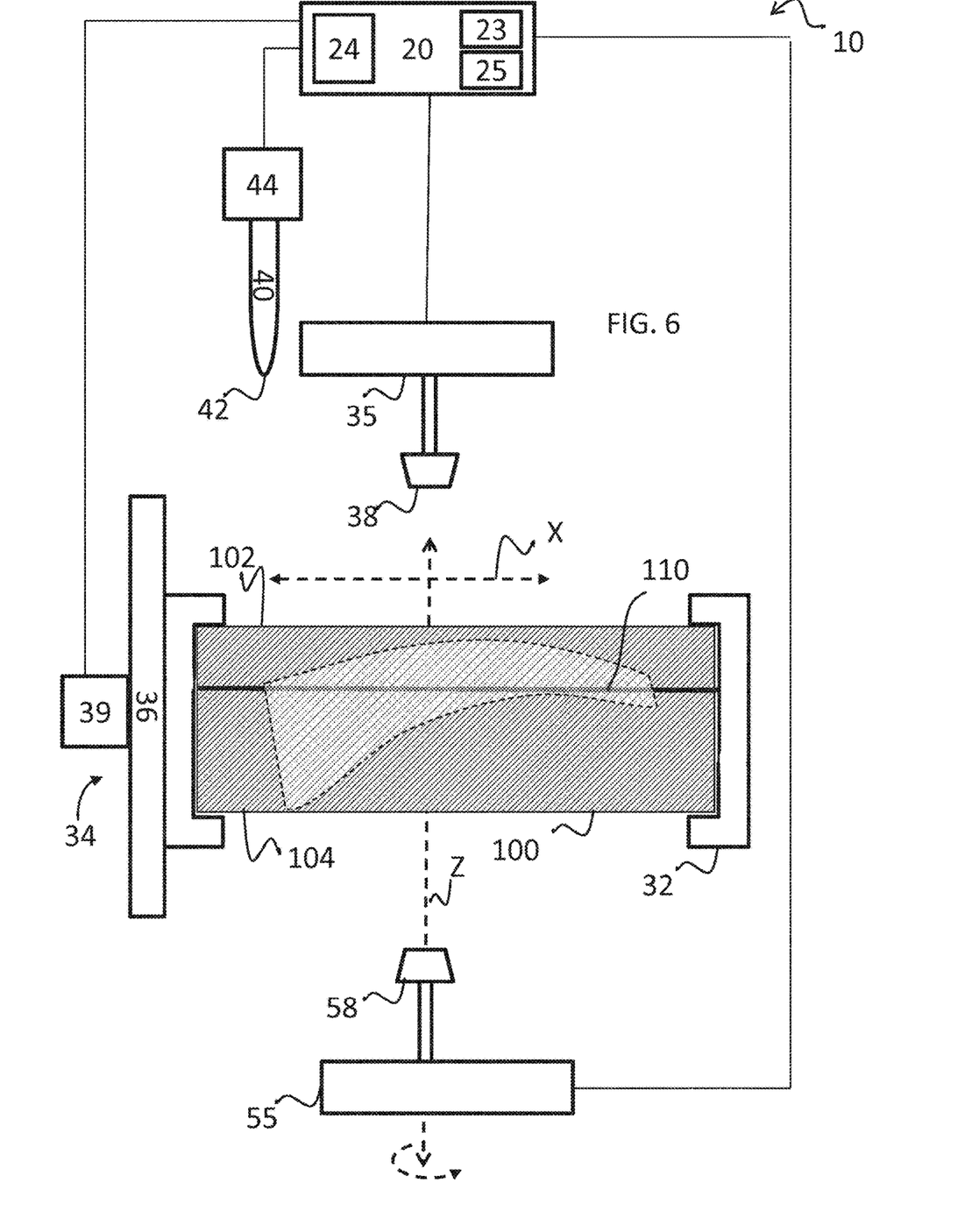
FIG. 6 is a diagram of an embodiment of a lens surfacing system in accordance with the present disclosure. A y-axis is perpendicular to both the x and z axes (e.g., normal to the page).

Referring to FIG. 6, another embodiment of a lens shaping system is shown, which is the same as the embodiment shown in FIG. 1, except it has a second surfacing tool 55 that allows the front and back surfaces of the lens blank to be simultaneously surfaced. The system controller 20 is operatively coupled to a first surfacing tool 35 and a second surfacing tool 55 and configured to generate a first set of shaping instructions and communication commands to the first surfacing tool 35 per the first shaping instructions and a second set of shaping instructions and communication commands to the second surfacing tool 55 per the second shaping instructions. In some embodiments, like the first surfacing tool 35, the second surfacing tool 55 can comprise a shaping head 58 that is configured to move along an x-axis, a y-axis, and/or a z-axis.

Another embodiment of the present disclosure is the same as that described above in connection with FIG. 1, except the lens blank contains a first transmitting layer and one or more light filtering layers but not a second light transmitting layer. With such a lens blank, only one surface (that defined by the light transmitting layer) needs to be shaped. The lens blank can further comprise other functional layers disposed on the side of the filtering layer that is opposite the light transmitting layer. Such other functional layers can include one or more anti-reflective layers, anti-static layers, or impact resistant layers.

If implemented in firmware and/or software, the software programs executing the steps described above may be stored as one or more instructions or code on a non-transitory computer-readable medium. Examples include non-transitory computer-readable media encoded with a data structure and non-transitory computer-readable media encoded with a computer program. Non-transitory computer-readable media are physical computer storage media. A physical storage medium may be any available medium that can be accessed by a computer. By way of example, and not limitation, such non-transitory computer-readable media can comprise RAM, ROM, EPROM, EEPROM, CD-ROM or other optical disk storage, magnetic disk storage or other magnetic storage devices, or any other physical medium that can be used to store desired program code in the form of instructions or data structures and that can be accessed by a computer.

Disk and disc includes compact discs (CD), laser discs, optical discs, digital versatile discs (DVD), floppy disks, and Blu-ray discs. Generally, disks reproduce data magnetically, and discs reproduce data optically. Combinations of the above are also included within the scope of non-transitory computer-readable media. Moreover, the steps described above may be achieved through dedicated devices rather than software, such as a hardware circuit comprising custom VLSI circuits or gate arrays, off-the-shelf semiconductors such as logic chips, transistors, or other discrete components, all of which are non-transitory.

Additional examples include programmable hardware devices such as field programmable gate arrays, programmable array logic, programmable logic devices, and/or the like, all of which are non-transitory. Still further examples include application specific integrated circuits (ASIC) or very large scale integrated (VLSI) circuits. In fact, persons of ordinary skill in the art may utilize any number of suitable structures capable of executing logical operations according to the described embodiments.

Embodiments of the present disclosure also include optical lenses made with one of the herein described process.

Lens blanks of the present disclosure can be made in a variety of ways and then surfaced with the systems and/or the methods described herein. In some embodiments, the lens blank can be made by casting. For example, a lens can be cast with a non-optimized film position. Of course, the cast layer in front of the film (a first transmitting layer) does not need to be the same material as the cast layer behind the film (a second transmitting layer). For example, a film can be placed onto a concave mold, back side filled then UV cured. The concave mold is then removed. A concave mold and gasket are then assembled using the previous casting as a concave mold to cast over the front side of the film.

In some embodiments, the lens blank can be made by lamination, e.g., by laminating a functional film (such as polar or PhCh) in between the front and back transmitting layers (such as glass (Gorilla), CVD metallic, plastic thermoplastic, or thermoset).

In some embodiments, the lens blank can be made by double side injection or double side extrusion, e.g., through double side injection or double side extrusion of a thermoplastic material with a photochromic wafers (or polarizing wafers) disposed therebetween.

A lens blank can also be made by the combination of any of the processes above. One example is where a blank can be manufactured by injection molding a polymeric material layer onto a functionalized film. This can then be placed into the back side of a casting mold where the functionalized film acts as a convex mold surface and some casting material is cast onto the film.

Such processes can produce lens blanks with a number of layer combinations. A few combination examples are as follows: polycarbonate/photochromic wafer/polycarbonate, poly(methyl methacrylate)/photochromic wafer/poly (methyl methacrylate), or polyamide/photochromic wafer/ polyamide. While the front and back transmitting layer materials are the same in these examples, it is understood that the two transmitting layers do not need to be the same material.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the systems and methods are not intended to be limited to the particular forms disclosed. Rather, they include all modifications and alternatives falling within the scope of the claims, and embodiments other than the ones shown may include some or all of the features of the depicted embodiments. For example, elements may be omitted or combined as a unitary structure and/or connections may be substituted. Further, where appropriate, aspects of any one of the examples described above may be combined with aspects of any other one(s) of the examples described above to form further examples having comparable or different properties and/or functions and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method of making a semi-finished or finished optical lens comprising:
   determining the position of at least a portion of a front surface or a back surface of a lens blank and/or the position of at least a portion of at least one of one or more light filtering layers within a lens surfacing system, wherein the one or more light filtering layers are located between the front surface and the back surface and
   shaping at least a portion of the front surface or the back surface of the lens blank according to shaping instructions, where the instructions comprise shaping map data indicative of a front surface or back surface of the optical lens such that the front surface or the back surface of the optical lens will not intersect with the one or more light filtering layers.

2. The method of claim 1, further comprising positioning the lens blank so that at least a portion of the one or more light filtering layers is disposed at a zeroed position on a coordinate axis, where the coordinate axis is an axis that extends between the front surface and the back surface of the lens blank.

3. The method of claim 2, further comprising rotating the lens blank to shape the front surface of the back surface not previously surfaced; repositioning the lens blank so that the light filtering layer is disposed at a zeroed position on the coordinate axis; and/or shaping the front surface of the back surface not previously shaped to form a finished optical lens.

4. An optical lens produced by a method according to claim 2.

5. The method of claim 1, wherein the lens blank comprises a first light transmitting layer that defines the front surface and a second light transmitting layer that defines the back surface, and the one or more light filtering layers are located between the first light transmitting layer and the second light transmitting layer.

6. An optical lens produced by a method according to claim 5.

7. The method of claim 1, where determining the position of at least a portion of the front surface or the back surface of the lens blank or the position of at least a portion of at least one of the one or more light filtering layers comprises measuring a thickness of one or more layers of the lens blank with a measurement gauge and determining the position based upon the measured thickness; receiving geometric characteristics data of the lens blank and determining the position based upon the geometric characteristics data; or a combination thereof.

8. An optical lens produced by a method according to claim 7.

9. The method of claim 1, where the position determining step is performed on a first lens blank representative of a plurality of lens blank and where the method further comprises shaping at least a portion of the front surface or the back surface of a second lens blank according to shaping instructions, where the instructions comprise shaping map data indicative of a front surface or back surface of the optical lens such that the front surface or the back surface of the optical lens will not intersect with the one or more light filtering layers.

10. An optical lens produced by a method according to claim 9.

11. The method of claim 1, further comprising generating instructions to transmit to a lens surfacing tool, where generating instructions further comprises receiving geometric characteristics data of a lens blank and of the semi-finished or finished lens and shifting the geometric characteristics data of one or both of the lens blank or the semi-finished or finished lens so that the one or more light filtering layers intersects with the one or more light filtering layers of the semi-finished or finished lens along substantially the entire perimeter of the semi-finished or finished lens.

12. An optical lens produced by a method according to claim 11.

13. The method of claim 1, where the semi-finished or finished lens defines a front surface and a back surface opposite the front surface and a peripheral surface extending between the front surface and the back surface and comprising a first light-transmitting layer defining the front surface, a second light-transmitting layer defining the back between the first and second light-transmitting layers, where the one or more light filtering layers are exposed at the peripheral surface of the semi-finished or finished lens.

14. The method of claim 1, where the finished lens has a first portion having a first diopter and a second portion having a second diopter that is different than the first diopter, and where the first diopter and the second diopter have a difference of at least 0.1 diopters.

15. The method of claim 14, where one or both of the first diopter and the second diopter is between −14 diopters to 20 diopters and/or where the back surface at the first portion or the second portion has a radius of curvature of at least 35 mm.

16. The method of claim 1, where the finished optical lens is a progressive, aspheric, or optical prism lens; where one or both light-transmitting layers can be thermoset polymers; where the one or more light filtering layers comprises one or more layers that have one or more functionalities selected from photochromic, tinting, polarizing, UV filtering, blue-blocking filtering, IR filtering, neutral density filtering, a mirror function, and anti-reflective function; and/or where the one or more light filtering layers comprises one or more layers selected from photochromic layers, tinted layers, polarizing layers, UV light filter layers, blue light filter layers, IR filter layers, neutral density filter layers, mirror layers, metallized layers, micropatterned layer, electrochromic layer, and an antireflective (AR) layer.

17. The method of claim 1, wherein a system controller comprising a microprocessor and memory is configured to execute the process of determining the position of at least a portion of a front surface or a back surface of a lens blank or the position of at least a portion of at least one of one or more light filtering layers within a lens surfacing system; and shaping at least a portion of the front surface or the back surface according to the shaping instructions.

18. An optical lens produced by a method according to claim 1.

19. A system for surfacing a lens blank comprising a first transmitting layer, a second light transmitting layer, and a light filtering layer disposed there between, wherein the system comprises:
   a lens surfacing tool;
   a lens positioning device;
   a lens mount mechanically coupled to the lens positioning device;
   an optical thickness measurement gauge; and
   a system controller comprising a microprocessor and memory,
      wherein the system controller is operatively coupled to the surfacing tool, the lens positioning device, and the optical measurement gauge and is configured to execute the process comprising:
      transmitting instructions to the lens positioning device for positioning the blank, where the instructions are based at least in part on the thickness of the one or more layers and
      transmitting instructions to the lens surfacing tool for shaping the first light transmitting layer, where the instructions comprise shaping map data indicative of a front surface or back surface of an optical lens to be made such that the shaped surface does not intersect with the light transmitting layer.

20. The system of claim 19, wherein the system controller is further configured to receive data from the optical thickness measurement gauge indicating the thickness of the one or more light filtering layers.

* * * * *